United States Patent [19]

Jamison et al.

[11] 4,387,798
[45] Jun. 14, 1983

[54] CASCADING CONVEYOR SYSTEM

[75] Inventors: Will B. Jamison, Bethel Park; David R. Hazen, McMurray, both of Pa.

[73] Assignee: Consolidation Coal Company, Pittsburgh, Pa.

[21] Appl. No.: 921,710

[22] Filed: Jul. 3, 1978

Related U.S. Application Data

[63] Continuation of Ser. No. 809,858, Jun. 24, 1977, abandoned, which is a continuation of Ser. No. 679,007, Apr. 21, 1976, abandoned.

[51] Int. Cl.³ .............................................. B65G 21/10
[52] U.S. Cl. .................................... 198/587; 198/606; 198/303
[58] Field of Search ........ 198/300, 303, 309, 586–589, 198/602, 603, 860–862, 606; 299/18, 33, 43, 45, 64, 67

[56] References Cited

U.S. PATENT DOCUMENTS

| | | | |
|---|---|---|---|
| 2,722,409 | 11/1955 | Bergmann | 198/587 |
| 2,805,760 | 9/1957 | Von Stroh et al. | 198/589 |
| 3,920,115 | 11/1975 | Craggs | 198/862 |

FOREIGN PATENT DOCUMENTS 1210515  3/1960  France .................................. 299/33

Primary Examiner—Joseph E. Valenza
Attorney, Agent, or Firm—William A. Mikesell, Jr.; Stanley J. Price, Jr.; John M. Adams

[57] ABSTRACT

A series of individual conveyor assemblies each having an independent endless belt conveyor extending longitudinally thereon are positioned in overlapping relationship. Each conveyor assembly includes a pivotal section adjacent a material receiving end portion thereof and is pinned to a material discharge end portion of a preceding section. The material discharge end portion overlies the material receiving end portion. The pivotal section connecting adjacent conveyors maintains the end portions thereof in material conveying relation as the assemblies extend along a curved path through the mine. A support beam is secured to the mine roof above the connected conveyor assemblies. Each conveyor assembly adjacent the receiving end portions thereof is secured to the support beam by a roller assembly that is longitudinally movable on guide tracks of the support beam. The conveyor assemblies are arranged to move on the support beam in response to the movement of a continuous mining machine and convey the mined material from the continuous mining maching at the rate the machine dislodges the material from the mine face.

5 Claims, 11 Drawing Figures

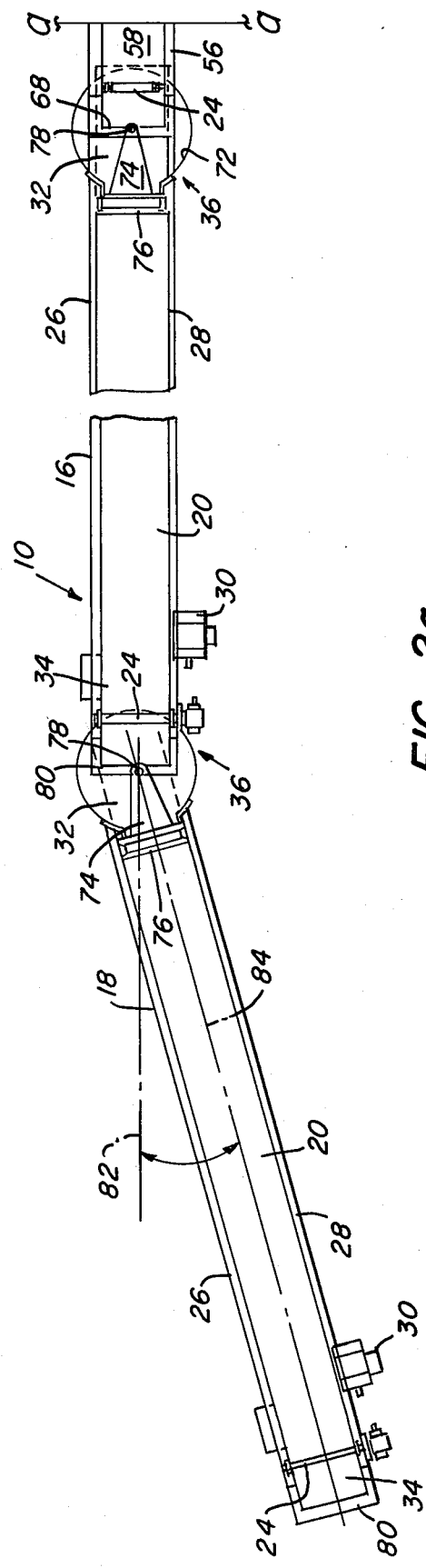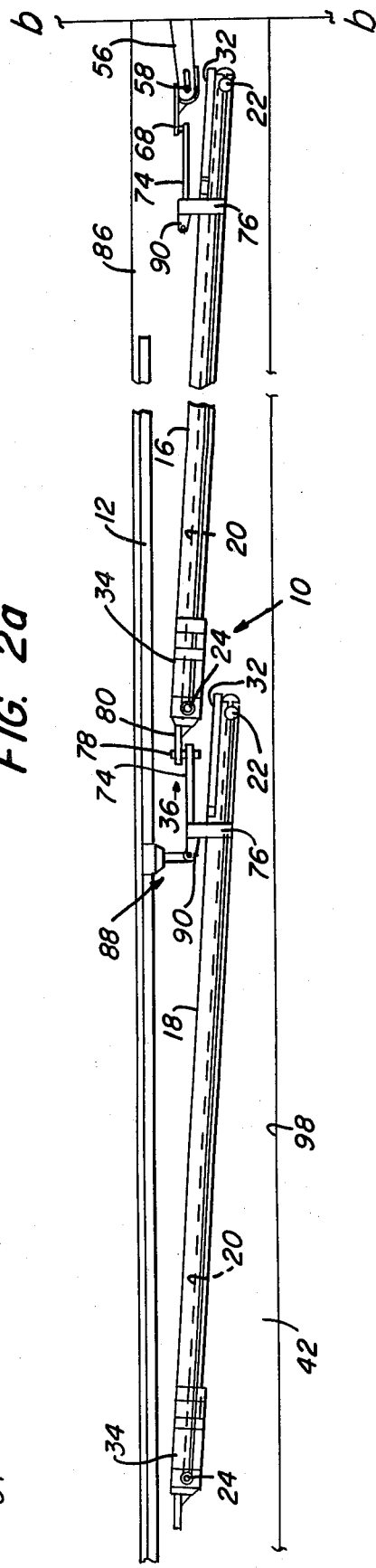

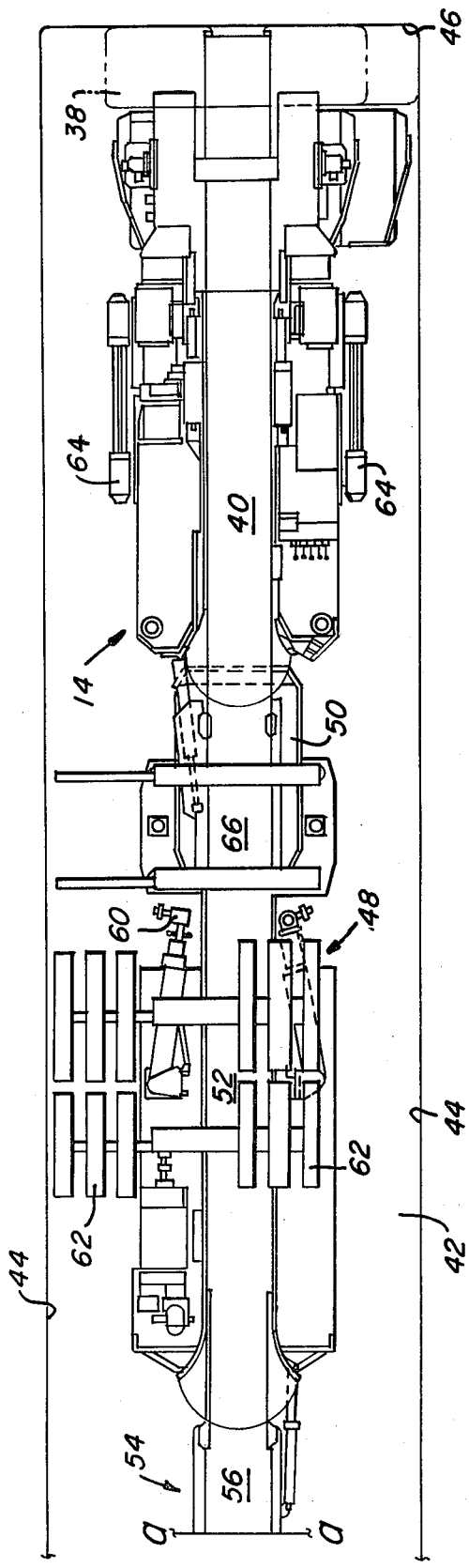
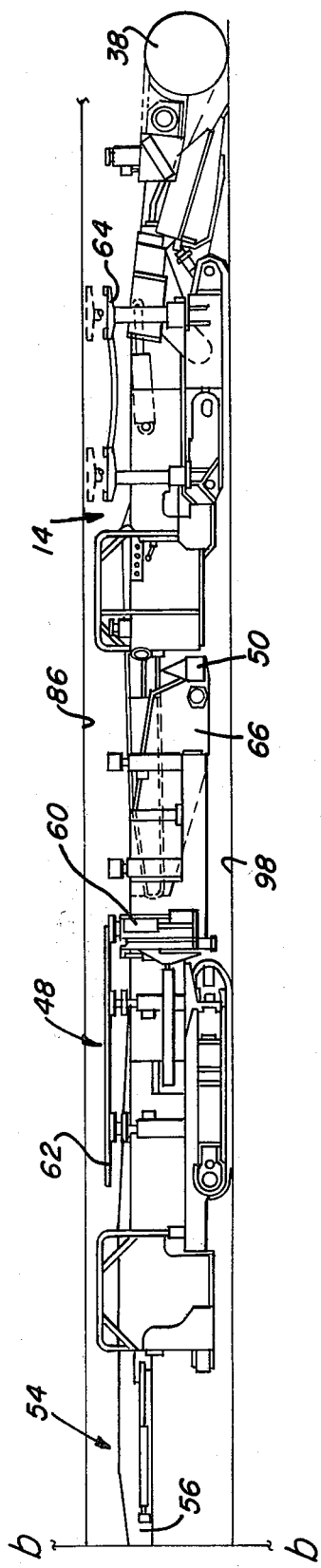

CASCADING CONVEYOR SYSTEM

CROSS REFERENCES TO RELATED APPLICATIONS

This application is a continuation of copending application Ser. No. 809,858, now abandoned, filed on June 24, 1977 entitled "Cascading Conveyor System" by Will B. Jamison and David R. Hazen, which in turn is a continuation of application Ser. No. 679,007 filed on Apr. 21, 1976 entitled "Cascading Conveyor System" by Will B. Jamison and David R. Hazen, now abandoned.

BACKGROUND OF THE INVENTION

1. Field of the Invention

This invention relates to a conveying system for underground mining and more particularly to a system of conveyor sections movably supported at the mine roof and connected to the discharge end portion of the continuous mining machine and movable therewith to provide a continuous conveying path for moving dislodged material rearwardly from the mining machine.

2. Description of the Prior Art

In underground mining operations conducted particularly by the pillar method of mining, a main longitudinal entry or haulageway is developed in the mineral seam with a plurality of lateral crosscuts connecting the main entryway with parallel entryways. In this manner, a plurality of pillars are formed and serve to support the mine roof. The mining operation is conducted by a continuous mining machine which is operable to dislodge the solid material from the face and convey it rearwardly to a discharge portion of the mining machine where it is removed from the mine either by a track haulage system or a permanent fixed belt-type conveyor that is operable to convey the dislodged material from the crosscuts to the main entry. In the main entry the dislodged material is deposited onto a main haulage belt that transports the mined material out of the mine to the surface.

It is of primary importance that the conveyor system connecting the continuous mining machine to the main haulage belt transports the material at a rate corresponding to the capacity of the continuous mining machine to dislodge the material from the face. However, a problem is encountered in removing the mined material from the working face at a rate which permits the uninterrupted operation of the continuous mining machine. The interruption occurs due to the inability of conventional track or belt-type conveyor systems to remove the material from the crosscut where the continuous mining machine is operating to the main haulage belt. The problem becomes more acute as the continuous mining machine progresses further in a crosscut and along a curved path from the main haulage belt. Substantial reductions in the width of the haulageway occur, and the mined material must be moved along a curved path by the fixed haulage system.

One solution to the problem of maintaining a continuous rearward movement of the mined material from the continuous mining machine is the use of self-propelled haulage-type vehicles, such as shuttle cars, which shuttle back and forth from the working face to a fixed discharge station where the mined material is conveyed to the surface. In carrying out the mine operation using the shuttle car, the continuous mining machine must stop the dislodging operation during intervals in which a loaded shuttle car is moved from material receiving relation with the mining machine discharge boom and an empty shuttle car is moved into position under the discharge boom. Consequently, the continuous mining machine is not able to obtain maximum efficiency by employing shuttle cars to transport mined material from the mine face.

Another method for conveying material from a continually advancing mining machine is illustrated and described in U.S. Pat. No. 3,795,304 and employs a movable surge vehicle. The surge vehicle has a haulage compartment with an endless conveyor having a receiving end portion positioned in underlying relation with the mining machine conveyor and a discharge end portion. The conveyor of the surge vehicle moves the dislodged material rearwardly at a controlled rate within the haulage compartment to the discharge end portion from which the mined material is deposited onto the upper surface of a flexible belt conveyor having end portions wound on rotatable spindles. The length of the belt is controlled by the amount of flexible belt remaining coiled on the rotatable spindles. In this manner, the effective length of the conveying surface may be controlled and coordinated with the loading and unloading of the surge vehicle as the continuous mining machine advances into the face and dislodges material therefrom. It is a primary object of this invention that the surge vehicle control the rearward movement of mined material from the face as to maintain a continuous rearward movement of the material on the flexible conveyor without interrupting the mining operation. However, this arrangement of conveying material rearwardly from the continuous mining machine has limited capability to follow a curved conveying path.

An additional solution that has been proposed to maintain uninterrupted operation of the mining machine and continuous conveyance of the mined material from the mining machine to the main haulage belt is disclosed in U.S. Pat. No. 3,003,612 and includes an extensible conveyor that extends between the fixed conveyor and the working face. The continuous mining machine is connected by a conveying path to a fixed conveyor station in which the conveying path includes a plurality of mobile conveyor sections so connected that the material discharged at the end of one section overlaps the material receiving end of the adjacent section. Each section is supported by a pair of wheels and is joined by a coupling that permits both vertical and horizontal articulation of each section as it follows a curved path through the mine and over the uneven terrain of the mine floor. The receiving section of the conveying apparatus is secured to the continuous mining machine with the remaining intermediate sections connecting the receiving section with a material discharge section. The conveying apparatus progresses with the continuous mining machine to provide a continuous conveying path rearwardly thereof.

There is need for conveying apparatus in mining operations for continuously conveying discharged material from the mine face along a curved path and is movable through the haulageways of a mine so as to provide a continuous interrupted conveying surface for the transportation of the mined material from the mine face at the rate the material is dislodged to provide a continuous mining operation.

SUMMARY OF THE INVENTION

In accordance with the present invention there is provided a conveyor system for transporting mined material in a mine that includes a series of longitudinally extending conveyor assemblies each having an independent endless conveyor. The endless conveyor includes a receiving end portion and a discharging end portion. A drive assembly is provided on each conveyor assembly and is operable to rotate the endless conveyor at a preselected peripheral speed to transport the mined material from the receiving end portion to the discharging end portion. A pivot assembly connects the discharging end portion of each of the conveyor assemblies to the receiving end portion of each adjacent conveyor assembly to permit horizontal pivotal movement of one conveyor assembly relative to the next adjacent conveyor assembly. The discharging end portion of each of the conveyor assemblies is arranged in overlapping relation with the receiving end portion of each adjacent conveyor assembly. A support member is secured to the mine roof for supporting each of the conveyor assemblies for longitudinal movement on the mine roof. A roof engaging assembly movably connects each of the conveyor assemblies secured to the support member at the mine roof.

In the preferred practice of the present invention, the series of longitudinally extending conveyor assemblies includes a material receiving section that is pivotally connected to the discharge boom of the continuous mining machine. The material dislodged by the continuous mining machine is conveyed from the discharge boom onto the conveyor assembly material receiving section. The material receiving section is connected at the discharging end portion thereof to a plurality of intermediate sections that provide a continuous conveying path for the mined material from the material receiving section to a material discharge section. The mined material is transferred from the discharging end portion of the material discharge section onto a fixed haulage belt or into a haulage-type vehicle, such as a shuttle car, for transporting the mined material to the surface.

Each of the conveyor assemblies is supported for longitudinal movement at the mine roof by a support member, such as an I-beam, that is bolted to the mine roof and extends throughout the various entryways and crosscuts developed in the mine. An alternative to securing the support beam to the mine roof by bolting is supporting the support beam adjacent the mine roof by temporary roof jacks and timbers or by C-frames to thus provide an expedient means of supporting the support member at the mine roof.

Each of the conveyor assemblies is connected for longitudinal movement on the support member by a roof engaging assembly that is movably secured at one end to the support member and pivotally connected at the other end adjacent the receiving end portion of each conveyor assembly. The roof engaging assembly includes roller members that are movably supported preferably on the flange members of an I-beam comprising the support member. With this arrangement, the conveyor system is raised above the ground floor and positioned adjacent the mine roof to facilitate the positioning of additional equipment on the mine floor, such as a fixed haulage belt to be used in combination with the conveyor system of the present invention.

The material receiving section of the series of conveyor assemblies is supported by the discharge boom of the continuous mining machine and the remaining intermediate sections and the material discharge section are movably supported by the overhead support member. The entire conveyor system advances and retracts with the continuous mining machine to thereby maintain the continuous mining machine in contact with a continuous conveying surface for rearwardly moving the mined material from the mine face. Consequently, the continuous mining machine is capable of operating at maximum efficiency without interruption due to the mining machine dislodging material at a rate greater than the rate of removing the mined material from the mine to the surface.

The pivotal assembly for connecting the adjacent end portions of each conveyor assembly permits the series of conveyor assemblies to extend along a curved path. Consequently, the series of longitudinally extending conveyor assemblies can extend a great distance through the mine connecting the continuous mining machine positioned, for example, in a crosscut with the main haulage belt positioned in the main haulageway.

Accordingly, the principal object of the present invention is to provide a conveyor system for transporting mined material over long distances in a mine and including a plurality of conveyor assemblies that are pivotally connected to permit the conveyor system to follow a curved path through the mine.

Another object of the present invention is to provide a system of conveyor assemblies that are independently supported for longitudinal movement along the mine roof and pivotally connected about the adjacent end portions to permit longitudinal movement along a curved path through the mine.

A further object of the present invention is to provide a series of longitudinally extending conveyor assemblies that are pivotally supported adjacent the overlapping end portions and suspended for longitudinal movement on the mine roof with a material receiving section connected to the discharge boom of the continuous mining machine and operable to advance therewith and convey the mined material rearwardly from the continuous mining machine at the rate the machine dislodges the material from the mine and thus permit continuous operation of the mining machine.

These and other objects and advantages of the present invention will be more completely disclosed and described in the following specification, the accompanying drawings and the appended claims.

BRIEF DESCRIPTION OF THE DRAWINGS

FIG. 1A is a top plan view of a conveyor assembly of the cascading conveyor system supported by a beam that is secured to the mine roof, illustrating the transfer point at the adjacent end portions of the pair of conveyor assemblies.

FIG. 1B is a top plan view of a continuous haulage machine and trailing bolter, illustrating the connection of the mining machine to the material receiving section of the cascading conveyor system.

FIG. 2A is a view in side elevation of the adjacently positioned end portions of a pair of conveyor assemblies, illustrating the pivotal connection of the adjacent end portions of the conveyor assemblies and the manner of supporting the conveyor assemblies by the overhead rail.

FIG. 2B is a view in side elevation of the continuous mining machine and trailing bolter illustrated in FIG. 1B.

DESCRIPTION OF THE PREFERED EMBODIMENT

Figure 3:
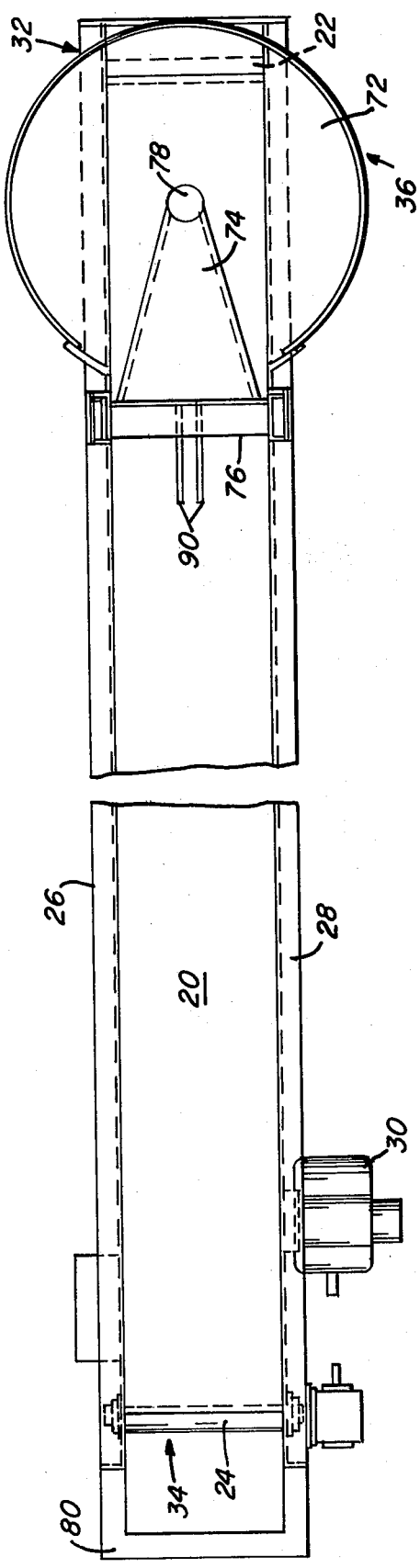
FIG. 3 is a fragmentary top plan view of a conveyor assembly of the cascading conveyor system, illustrating the transfer point at which adjacent conveyor sections are connected.

Referring to the drawings and particularly to FIGS. 1A, 1B, 2A and 2B, there is illustrated a cascading conveyor system generally designated by the numeral 10 that is supported for longitudinal movement by a beam member 12 that is secured to the mine roof by conventional bolt means and is connected at one end portion to a continuous mining machine generally designated by the numeral 14 in FIGS. 1B and 2B. The cascading conveyor system 10 includes a plurality of individual conveyor assemblies in which conveyor assembly 16 and 18, illustrated in FIGS. 1A and 2A, are representative. The conveyor assemblies 16 and 18 are movably supported on the overhead beam member 12 to advance with the continuous mining machine 14.

Each of the conveyor assemblies 16 and 18 includes an endless conveyor mechanism 20 such as a chain flight conveyor or a flexible conveyor belt that is rotatably supported at the end portions of the respective conveyor assemblies by turnaround belt rollers 22 and 24 that are rotatably mounted in the parallel spaced frame members 26 and 28. Each of the endless conveyor belts 20 of the respective conveyor sections is propelled about the turnaround rollers 22 and 24 by a conventional belt drive mechanism 30 that is drivingly connected in a suitable manner to the turnaround belt roller 24. In this manner, the conveyor belts 20 rotate about respective belt rollers 22 and 24 between the frame member 26 and 28 to transport the mining material rearwardly from the continuous mining machine 14. Each of the conveyor assemblies 16 and 18 includes a receiving end portion 32 and a discharge end portion 34.

The discharge end portion 34 of conveyor assembly 16 is positioned in overlapping relation with the receiving end portion 32 of conveyor 18, and the respective end portions are connected by a pivot assembly generally designated by the numeral 36. The pivot assembly 36 prevents lateral pivotal movement of the conveyor assemblies relative to each other and thereby facilitates a change of direction of the conveyed material as it is transferred from the continuous mining machine onto the cascading conveyor system 10. The material is conveyed by the conveyor system 10 to a point where the material is conveyed by the conveyor system 10 to a point in the mine where the material is either transferred onto a main belt leading out of the mine or into shuttle cars positioned remotely from the continuous mining machine for transporting the mined material from the mine.

The cascading conveyor system 10 of the present invention is operatively employed with the continuous mining machine 14, illustrated in FIGS. 1B and 2B. The mining machine 14 may be of any conventional type, such as a drum-type mining machine that operates in an underground mine and has a cutting head 38 and a conveyor 40 extending rearwardly therefrom. The mining machine 14 continuously advances through an entry 42 having ribs or sidewalls 44 and a mine face 46. The entry 42 is formed by the mining machine cutting head 38 continuously dislodging material from the mine face 46 and transferring the mined material into a machine for transferring mined material generally designated by the numeral 48. A material receiving end portion 50 is positioned adjacent the rearward portion of the continuous mining machine 14.

The apparatus for transferring mined material 48 from the continuous mining machine 14 to the cascading conveyor system 10 is disclosed in U.S. Pat. No. 3,995,905 entitled "Method And Apparatus For Transferring Mined Material."

The material dislodged from the mine face 46 is conveyed rearwardly by the mining machine conveyor 40 onto the material receiving end portion 50 of a main conveyor 52 that extends longitudinally the length of the transfer apparatus 48. The main conveyor 52 moves the material from the receiving end portion 50 to a material discharging end portion generally designated by the numeral 54. The material discharging end portion 54 includes an end conveyor 56 that is connected to the main conveyor 52 to pivot relative thereto about a fixed vertical axis. The receiving end portion of end conveyor 56 is connected to the end of the main conveyor 52 for pivotal movement about a fixed vertical axis by operation of a piston cylinder assembly, illustrated in FIGS. 1B and 2B. The end conveyor 56 includes a discharge end portion 58, illustrated in FIGS. 1A and 2B. The discharge end portion 58 is connected to the receiving end portion 32 of conveyor assembly 16 by the pivot assembly 36. The conveyor assembly that is attached to the discharge end portion 58 is the material receiving section of the series of conveyor assemblies constituting the conveyor system 10 and is connected by intermediate sections to a material discharge section at the end of the series of conveyor assemblies.

With this arrangement, the mined material is transferred from the end conveyor 56 of the transfer apparatus 48 onto the cascading conveyor section 16. The transfer apparatus 48 also includes roof bolters 60 that are pivotally mounted on opposed sides of the apparatus 48 to drill holes and install roof bolts in a mine roof for support of the mine roof as the continuous mining machine advances forwardly through the entry 42. Additional roof support is provided by a plurality of mechanically actuated roof supports 62 that are provided on the material transfer apparatus 48. Also, the mining machine 14, illustrated in FIGS. 1B and 2B, includes vertically movable roof supports 64 that are arranged to provide temporary roof support above the mining machine 14 when the machine is not advancing into the mine face and dislodging material therefrom.

The material receiving end portion 50 of the transfer apparatus 10 includes a receiving hopper 66 which is constantly maintained in uderlying relationship with the discharge end of the mining machine conveyor 40. The material is dislodged from the mine face 46 and is continuously discharged into the receiving hopper 66 and is transferred therefrom by the main conveyor 52 to the end conveyor 56 onto the conveyor 16 or material receiving station of the cascading conveyor system 10. Should the mining machine 14 dislodge material at a rate greater than the capability of the cascading conveyor system 10 to transport the material from the transfer apparatus 48, the excess material is temporarily stored within the receiving hopper 66.

During the mining operation the discharge end of the mining machine conveyor 40 remains in overlying relationship with receiving end portion of the transfer apparatus main conveyor 52 while the discharging end portion 58 of the transfer apparatus end conveyor 56 remains in overlying relationship with the receiving end portion of the cascading conveyor assembly 16. With this arrangement, the continuous movement of the mined material from the mining machine 14 to the cascading conveyor assembly 16 and the following assemblies is effected. Thus, the continuous operation of the mining machine 14 is not interrupted as the mined material is dislodged from the mine face 46 and transported rearwardly by the cascading conveyor system 10.

As illustrated in FIGS. 1A and 2A, the discharging end portion 58 of the transfer apparatus end conveyor 56 is positioned in overlying relationship with the receiving end portion 32 of the conveyor material receiving section 16 and is connected thereto by the pivot assembly 36. With this arrangement, the mined material moved rearwardly by the end conveyor 56 is continuously deposited onto the cascading conveyor system 10 that extends rearwardly from the mining machine 14 in the mine entry 42.

The pivotal connection of the discharging end portion 58 to the receiving end portion 32 includes a yoke member 68 of the end conveyor 56. The yoke member 68 is pivotally connected to the pivot assembly 36 of the conveyor assembly 16. An example pivotal assembly is illustrated in FIG. 3 and includes an enlarged diameter gathering surface 72 that extends upwardly and in surrounding relationship with the belt 20. A portion of the gathering surface 72 remains positioned in underlying relationship with the discharging end portion 58 to assure that the material discharged from the end of the conveyor 52 is deposited on the conveyor assembly 16.

A pivot plate 74 is secured at one end portion to a bracket 76 that extends upwardly from the frame portions 26 and 28 of the conveyor 16. The pivot plate 74 extends above the receiving end portion 32 into underlying relation with the yoke member 68. A vertical pin 78 extends upwardly from the end portion of the pivot plate 74, and a circular opening is provided in the yoke 68 for receiving the vertical pin 78. With this arrangement, the conveyor end portion 32 is connected to the conveyor end portion 58 for pivotal movement about a vertical axis through the pin member 78.

The discharging end portion 34 of conveyor assembly 16 is also provided with a yoke member 80 similar to the yoke member 68 of the conveyor end portion 58 for receiving the vertical pin 78 of the pivot plate 74 for the end portion 32 of the conveyor assembly 18. As illustrated in FIG. 1A, the conveyor section 16 has a longitudinal axis 82 that is positioned in intersecting relationship with the longitudinal axis 84 of conveyor assembly 18. The respective axes 82 and 84 intersect about the pivotal connection of the respective conveyors such that the conveyor 18 is pivoted through an angle relative to the conveyor 16. With this arrangement, the adjacent end portions of the conveyor assemblies comprising the cascading conveyor system 10 articulate at the end portions thereof to permit pivotal movement of the conveyor system as the conveyor assemblies extend angularly from a main entry to a crosscut or side entry.

The cascading conveyor system 10 is movably supported to the support beam 12 that is secured by conventional bolting means to the mine roof 86 by a plurality of roller assemblies generally designated by the numeral 88. Each of the roller assemblies 88 is secured to a pair of parallel spaced arm members 90 that extend rearwardly from the mounting bracket 76 of the pivot assembly 36. Roller assemblies 88 are slidably positioned on the upper and lower flanged surfaces of the support beam 12 and are movable along the length thereof as the mining machine 14 operates in the entryway 42. With the cascading conveyor system 10 secured in the above described manner to the end conveyor 56 of the transfer apparatus 48, the respective conveyor assemblies, such as the conveyor assemblies 92, 94 and 96, illustrated in FIG. 4, move longitudinally on the support beam 12. The conveyor assemblies 92, 94 and 96 remain in material receiving relationship with the mining machine 14 and the transfer apparatus 48 and are operable to convey the mined material away from the mine face and out of the mine by transfer from one conveyor assembly to the next successive conveyor assembly.

Figure 4:
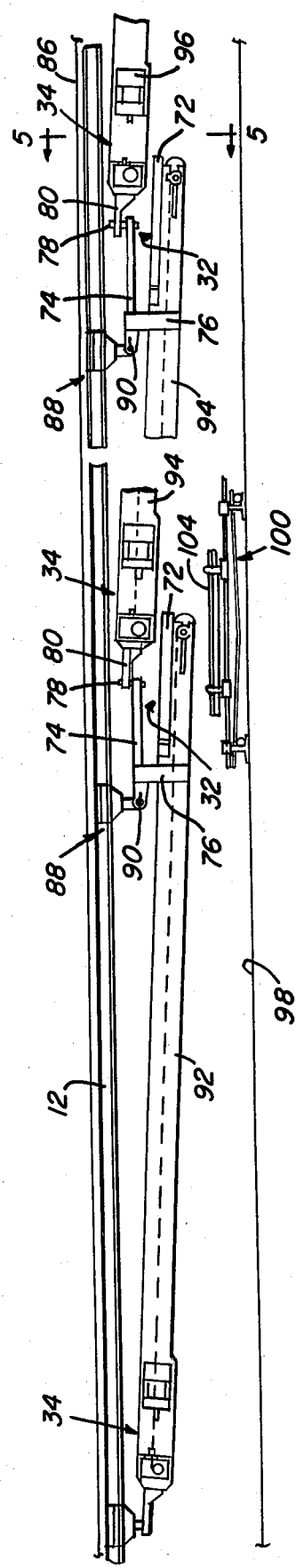
FIG. 4 is a view in side elevation of the cascading conveyor system, illustrating in detail the pivotal connection of the end portions of a pair of conveyor assemblies and the connection of the conveyor assemblies to the beam member that is secured to the mine roof.

Further, in accordance with the present invention, a conventional conveyor belt 100, as illustrated in FIG. 4, may be incorporated in the mining operation with the cascading conveyor system 10. The blt conveyor 100 is positioned on the mine floor 98 and is further illustrated in FIG. 5. The conveyor 100 includes an endless flexible conveyor belt 102 having an upper conveyor surface 104 that is supported by a plurality of rotatably mounted idler cylinders 106 that define a trough to shape the upper surface 104 and prevent flattening thereof. A horizontal return belt idler roller 108 is positioned beneath the idler rollers 106 to support the lower or return run surface 110 of the conveyor belting 100.

The belt conveyor 100 extends longitudinally through the mine entry 42 and is positioned in underlying relationship with the conveyor assemblies of the cascading conveyor system 10. In conventional mining operations the belt conveyor 100 transports the mined material deposited thereon by a shuttle car which shuttles back and forth between the continuous mining machine 14 and the furthermost point in the mine to which the conveyor belt 100 extends. In utilizing the belt conveyor 100 with the conveyor system 10 the delays normally encountered in loading the conveyor 100 by shuttle car operation are avoided with the conveyor system of the present invention. Principally the continuous mining machine may operate without interruption which occurs during the loading and unloading cycle of a shuttle car. A selected one of the conveyor assemblies of the conveyor system 10 may be removed from connection with the support beam 12 and positioned in discharging relation with the upper conveyor surface 104 of the conveyor belt 100. Loading of the belt 100 may also be accomplished by reversing the direction of rotation of the conveyor belt of the conveyor assembly to feed the belt 100 from the receiving end portion of a conveyor assembly. Thus by reversing the rotation of the conveyor of assembly 92, illustrated in FIG. 4, the mined material discharged from the discharging end portion of conveyor assembly 94 onto the receiving end portion of conveyor assembly 92 is transferred from the receiving end portion thereof onto the upper conveyor surface 104 of belt 100. In this manner, the respective conveyor assemblies remain supported from the mine roof.

The material dislodged by the continuous mining machine 14 is moved rearward by the cascading conveyor system 10 and is deposited on the main conveyor belt 100 which may be positioned remotely of the continuous mining machine in the mine. As the continuous mining machine advances further into the mine, additional conveyor assemblies may be added onto the conveyor system 10 with an assembly thereof remaining in discharging relationship with the belt conveyor 100 on the mine floor.

The above described arrangement for removing the coal from the mine face constitutes a substantially continuous mining operation that eliminates the delays which are conventionally encountered with a shuttle car operation in transporting the mined material from the continuous mining machine to the main belt conveyor 100. The versatility of the cascading conveyor system 10 is apparent by the fact that the conveyor system 10 is infinite in length and thereby provides a continuous conveying surface connecting the continuous mining machine 14 with the main belt conveyor 100.

Figure 5:
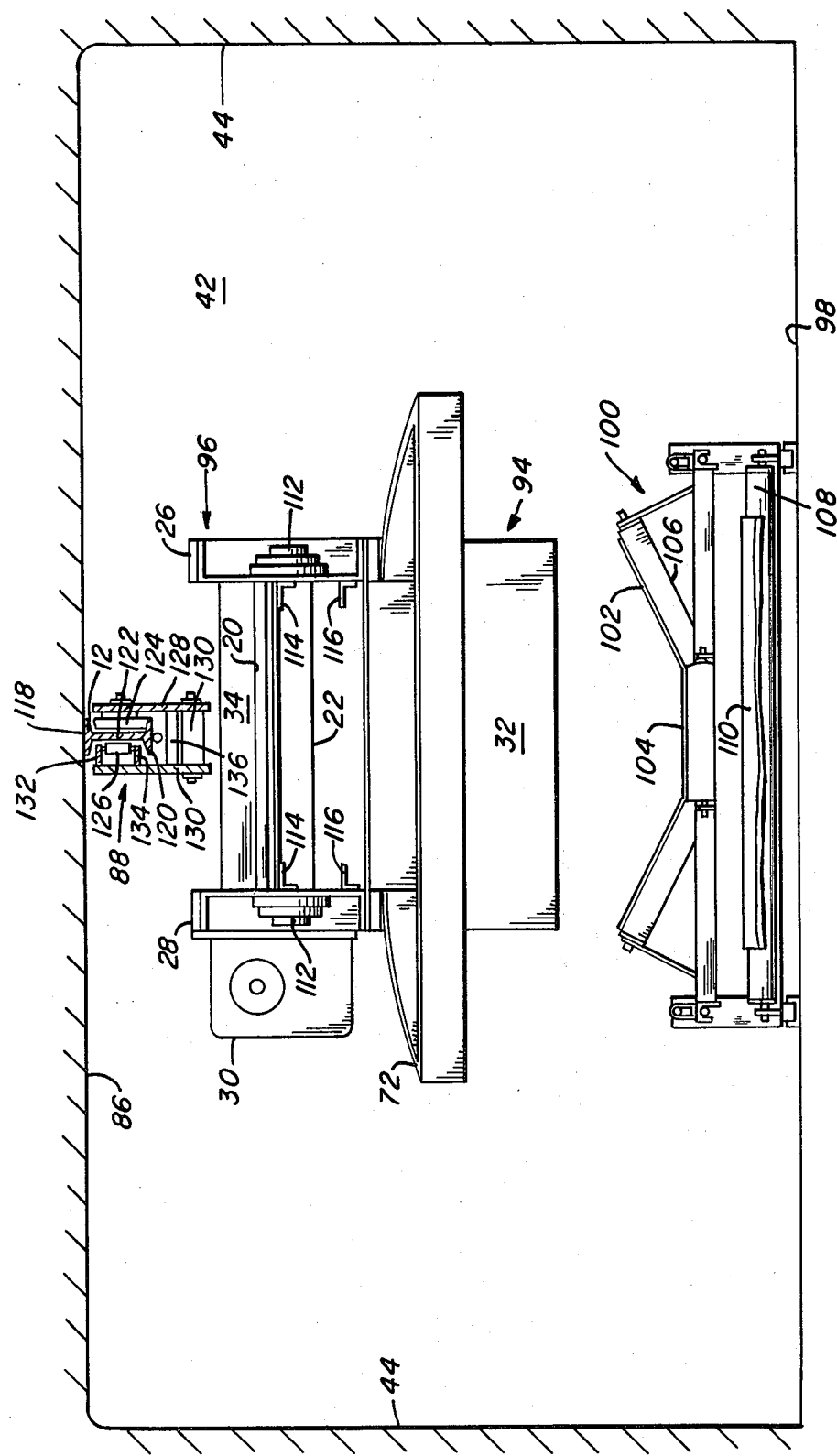
FIG. 5 is a sectional view of a conveyor assembly taken along line V—V of FIG. 4, illustrating the manner in which the conveyor assemblies are supported by the beam member that is bolted to the mine roof and a main haulage belt positioned on the mine floor for receiving the mined material from the cascading conveyor system.

Referring to FIG. 5 there is illustrated the overlying relationship of the discharging end portion 34 of conveyor assembly 96 with the receiving end portion 32 of the conveyor assembly 94, as described hereinabove. The receiving end portion 32 includes an expanded receiving portion 72 that extends rearwardly toward the endless belt of the conveyor for confining and directing all the material that is discharged from the conveyor assembly 96 on the end portion of the conveyor assembly 94. The turnaround belt roller 22 of conveyor assembly 96 is rotatably mounted in journals 112 that are supported by the conveyor frame members 26 and 28 that extend upwardly from opposed sides of the endless belt 20.

The upper or horizontal advancing surface of the endless conveyor 20 is supported by a pair of angle members 114 that are oppositely secured to the frame members 26 and 28. A supporting surface is provided for the lower or horizontal returning surface of the endless conveyor 20 by the angle members 116 that are secured to the frame members 26 and 28 below the angle members 114. With this arrangement, the mined material is conveyed rearwardly from the mining machine 14 and the transfer apparatus 48 on the endless conveyor 20 of the conveyor assembly 96. As the belt 20 advances around the turnaround belt roller 22, the material is discharged from the discharging end portion 34 into the receiving portion 72 of the receiving end portion 32 of the conveyor assembly 94.

Each of the conveyor assemblies of the cascading conveyor system 10 is movably secured to the overhead support beam 12 by the roller assembly 88, illustrated in FIGS. 2A, and 5. The beam member 12 is held in place against the mine roof 86 by a plurality of roof bolts that extend a sufficient depth into the mine roof 86 to securely anchor the beam 12 to the mine roof 86. The beam 12 is preferably an I-beam having upper and lower flanges 118 and 120. The flanges 118 and 120 are separated by a vertical web portion 122. A roller 124 is positioned between the flanges 118 and 120 is supported by the upper surface of flange 120. A guide roller 126 is positioned oppositely of the roller 124 between the flanges 118 and 120. A pair of plate members 128 and 130 are positioned in spaced parallel relation on opposite sides of the web portion 122. The roller 124 is rotatably supported by the upper end portion of the plate member 128. The guide roller 126 is retained between the flanges 118 and 120 by the spaced horizontal guide members 132 and 134 that are secured to the upper end portion of the plate member 130. With this arrangement, the roller 124 and the guide roller 126 are maintained between the flanges 118 and 120 with the roller 124 rotatably supported on the surface of flange 120.

The lower end portions of the plate members 128 and 130 are maintained in spaced relation by a bar 136. The conveyor assembly 94 is secured to the roller assembly 88 by connection of the horizontally extending arm members 90 illustrated in FIG. 3 to the vertically extending plate members 128 and 130. In a manner not illustrated in FIG. 5, the parallel arm members 90 are positioned between the spaced parallel plates 128 and 130. A pin member 138, illustrated in FIG. 5, extends through aligned bores of the respective members 90, 128 and 130. With this arrangement, the receiving end portion 32 of each of the conveyor assemblies of the cascading conveyor system 10 is supported for longitudinal movement on the support beam 12.

The roller 124 is freely rotatable on the beam 12 to permit the conveyor assemblies of the cascading conveyor system 10 to advance and retract in the mine in response to the forward and reverse movement of the mining machine 14. This arrangement permits conveyor assemblies of the cascading conveyor system to move with the mining machine and thereby maintain the mining machine in contact with a continuous conveying surface for the rearward movement of the mined material. Thus, the mined material moves continuously from the continuous mining machine permitting operation of the mining machine without interruption in conveyance of the mined material from the mine face.

Figure 6:
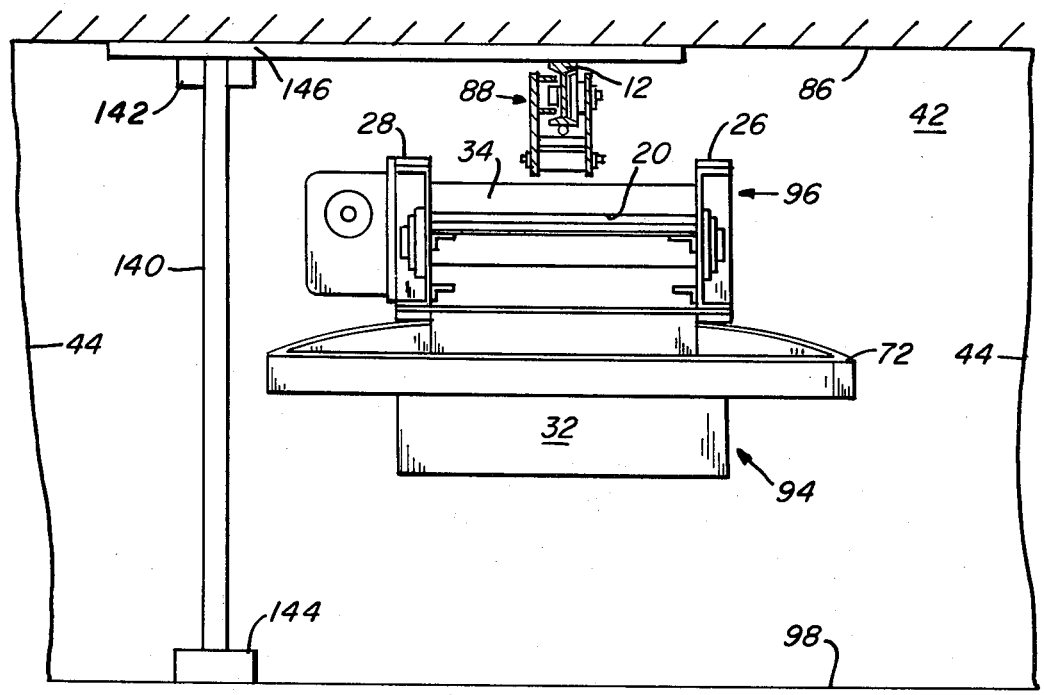
FIG. 6 is a sectional view of the cascading conveyor system positioned in mine entryway, illustrating the overhead support beam secured to a combination roof jack and timber support erected in the mine entryway.
Figure 7:
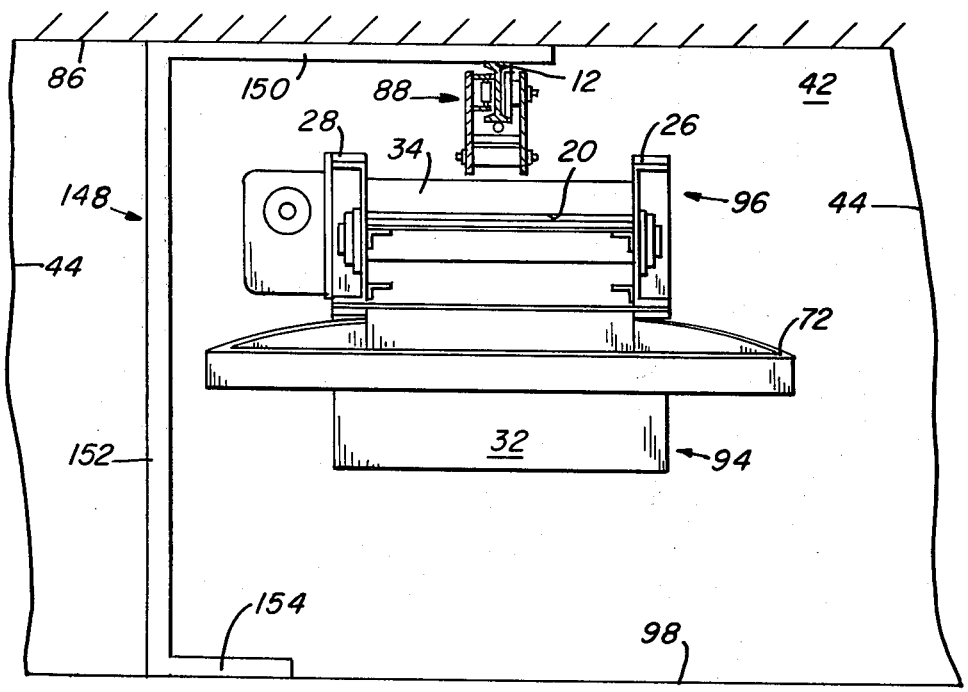
FIG. 7 is a sectional view of the cascading conveyor system positioned in mine entryway similar to FIG. 6, illustrating the overhead support beam temporarily secured to a C-frame positioned in the mine entryway.

Further in accordance with the practice of the present invention, alternative arrangements are illustrated in FIG. 6 and 7 for supporting the beam member 12 adjacent the mine roof 86. As illustrated in FIG. 5, the beam member 12 is held in place at the mine roof 86 by conventional roof bolts which serve to permanently secure the beam 12 to the mine roof. However, it may be desirable in certain operations to temporarily support the beam 12 at the mine roof as opposed to permanently securing the beam 12 in place by roof bolts. Provisions for temporarily supporting the beam support devices are illustrated in FIGS. 6 and 7.

In FIG. 6 there is illustrated a conventional roof jack 140 having extensible end portions with brace members 142 and 144 arranged to rigidly engage the mine roof 86 and mine floor 98, respectively. A beam member 146, such as a wooden timber, is held in abutting relation with the mine roof 86 by the brace member 142. The timber 146 is positioned transversely between the mine sidewalls 44. The beam member 12 is then secured by conventional bolting means to the timber 146. In this manner, the beam 12 is supported adjacent the mine roof 86. The versatility of supporting the beam 12 by the roof jack and timber combination permits the cascading conveyor system 10 to be easily erected for temporary operation as required by the mining operation.

Another embodiment for temporarily supporting the beam member 12 adjacent the mine roof 86 is illustrated in FIG. 7 and includes a C-frame member 148. The C-frame member 148 has an upper horizontally extending support portion 150 that is connected preferably by an extensible vertical portion 152 to a lower portion having a horizontal support base 154 that is positioned on the mine floor 98. The vertical portion 152 is raised to urge the upper support portion 150 into abutting relation with the mine roof 86. In this manner, the C-frame is rigidly retained between the mine roof and floor. The support beam 12 is connected in a conventional manner to the upper support portion 150 and is thus rigidly positioned adjacent the mine roof 86 for supporting the conveyor assemblies. In a manner similar to the arrangement for supporting the beam 12, as illustrated in FIG. 6, the C-frame 148 may be easily assembled and disassembled to provide an efficient and versatile arrangement for supporting the beam 12 in the mine.

Figure 8:
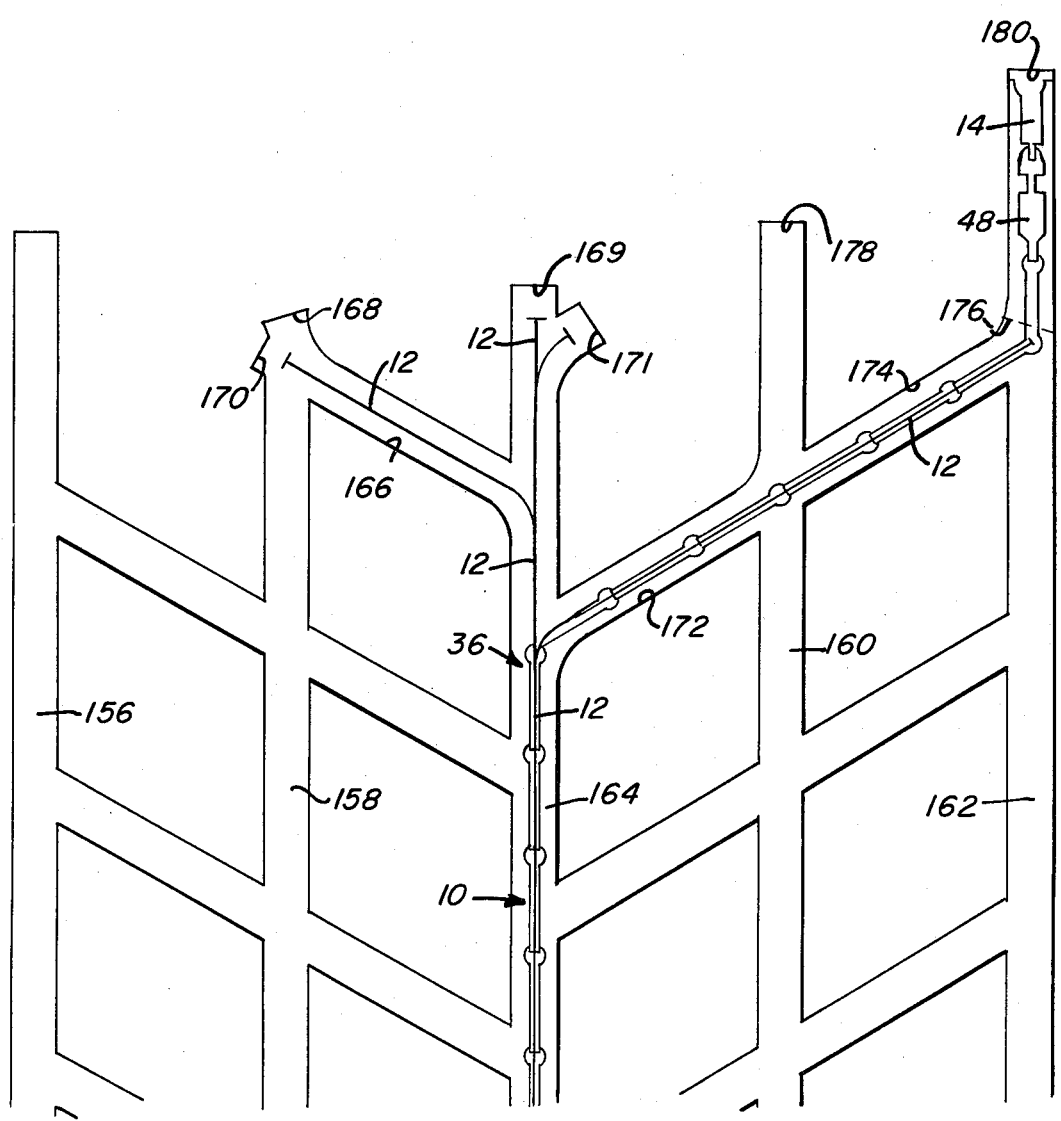
FIG. 8 is a schematic representation of a mine plan, illustrating a method of mining utilizing the continuous mining machine and trailing bolter in combination with the cascading conveyor system.
Figure 9:
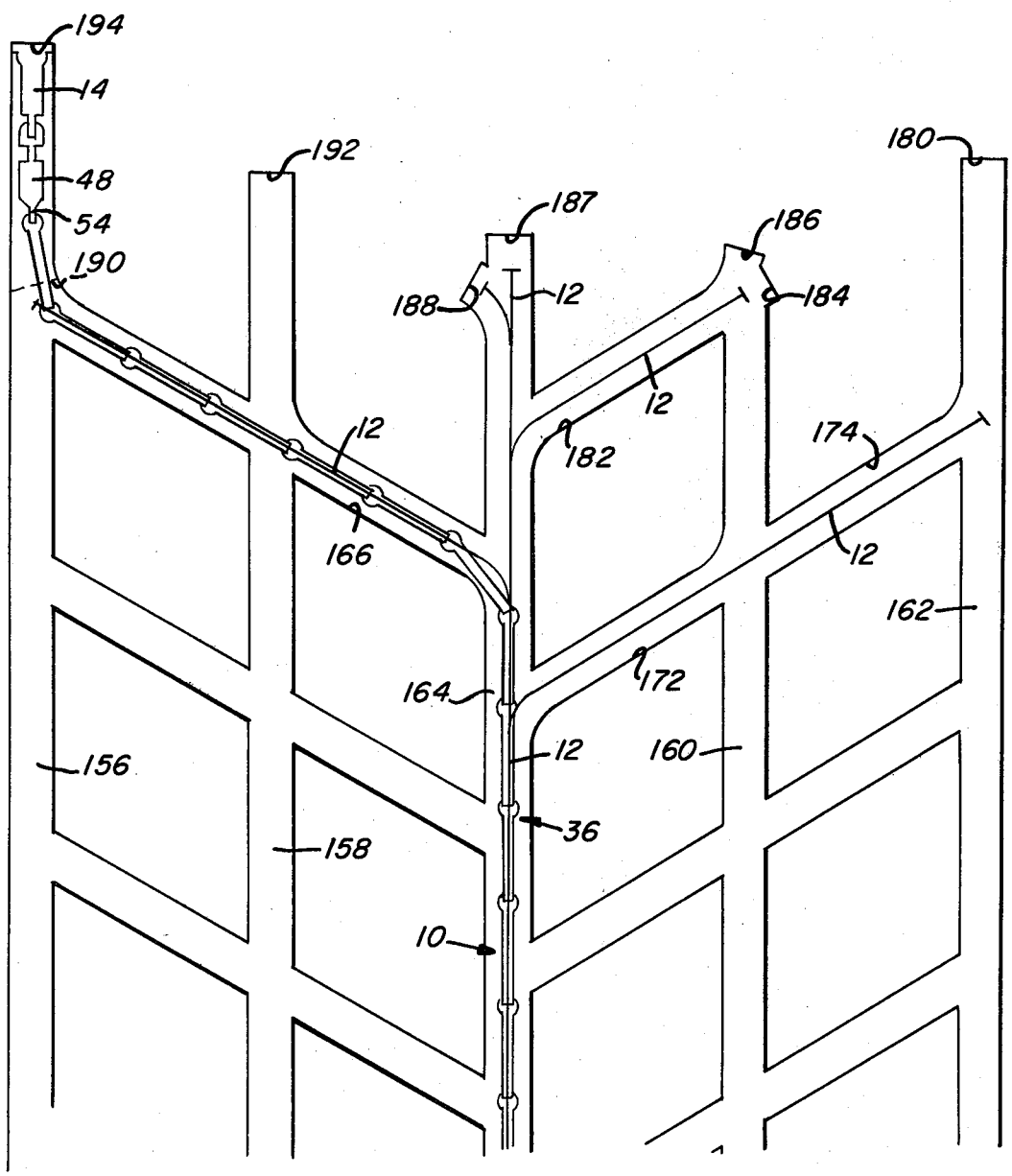
FIG. 9 is a schematic representation of a mine plan, illustrating a method of mining with the cascading conveyor system similar to FIG. 8.

Referring to FIGS. 8 and 9, there is schematically illustrated a method of mining utilizing the cascading conveyor system 10 in combination with the continuous mining machine 14 and the transfer apparatus with trailing bolter 48. The method of mining illustrated in FIGS. 8 and 9 is generally referred to as the pillar method in which a plurality of main entries or haulageways 156, 158, 160 and 162 are systematically developed in spaced relationship on opposite sides of a main or belt entry 164. Th entries are joined by crosscuts which may extend at right angles or at any other preselected angle from the respective entries. In this manner, the mineral is extracted from the seam forming intervening pillars that are left in place to support the mine roof. The pillar method of mining is particularly adaptable to the mining of flat seams and provides for a systematic recovery of the mined material.

As illustrated in FIG. 8, the method of mining is carried out by positioning the support beam 12 within the main entry 164 and extending branches of the support beam therefrom into the crosscuts as they are progressively and systematically formed by the advancement of the continuous mining machine. The main entry 164 serves as the central artery from which the branch portions of the support beam 12 extend to connect the cascading conveyor system with the continuous mining machine.

A crosscut 166 is initially formed by advancement of the continuous mining machine 14 from the main entry 164 to intersection with the entry 158 and transfer apparatus 48 with the material receiving section of the conveyor system 10 connected to the end conveyor of the transfer apparatus. At the intersection of crosscut 166 with entry 158, the continuous mining machine 14 forms the turn for the extension of the entry 158 and advances in the direction of a crosscut to be formed between entry 158 and 156. Having formed the faces 168 and 170, the continuous mining machine 14 with the cascading conveyor system attached thereto is retracted from the crosscut 166 into the main entry 164. The mining machine 14 is then forwardly advanced in the main entry 164 to the point where mine face 169 is located, and a turn from entry 164 rearwardly of mine face 169 is completed to mine face 171 for a future crosscut to be advanced therefrom. Thereafter, the mining machine 14 is retracted to the intersection of the previously formed crosscut 172 and the main entry 164. Having moved the continuous mining machine into crosscut 172, the forward extensions of the support beam 12 are installed to the mine faces 169 and 171 in the main entry 164 and in crosscut 166 to the mine face 170. Also, during the installation of the support beam 12 roof bolting, not completed by the bolters on the transfer apparatus 48, is completed by a conventional bolting machine in crosscut 166 and the forward extensions of main entry 164.

The continuous mining machine 14 is advanced into the crosscut 172 to the entry 160. With the support beam installed in the crosscut 172 behind the machine 14, the cascading conveyor 10 follows the progress of the continuous mining machine as it advances beyond entry 160 to form a crosscut 174 between entries 160 and 162 terminating at mine face 176 in entry 162. Accordingly, during the forward progress of the mining machine, the dislodged material is continually conveyed rearwardly by the cascading conveyors from the crosscuts 174 and 172 to the main entry 164. From the main entry 164 the intermediate sections transport the mined material to a point in the mine where the cascading conveyor system material discharge section connects with a main belt or other haulage means, such as shuttle car operation, for removing the mined material from the mine. As described hereinabove the crosscuts extend at an angle from the entries such as 90° or 60°. By the pivotal connection between the conveyor assemblies the conveyor system extends angularly from the entries into the crosscuts to provide a continuous curved conveying surface rearwardly from the mining machine.

Having reached the mine face 176 in entry 162, the mining machine 14 is retracted to the intersection of the crosscuts 174 and 172 with the entry 160 with the conveyor assemblies advancing rearwardly on the beam member 12. At this point the entry 160 is forwardly extended to mine face 178 which locates the approximate intersection of the entry 160 with a future crosscut to be advanced from mine face 171. With the continuous mining machine 14 operating in the forward extension of entry 160 beyond the crosscuts 172 and 174, the conveyor support beam 12 is installed in the crosscut 174 between entries 160 and 162.

Thereafter, the continuous mining machine 14 is retracted from the newly developed mine face 178 of entry 160 and is advanced to the previously formed mine face 176 of entry 162. At this point the mining machine advances in entry 162 to dislodge material to mine face 180. The mine face 180 locates the approximate intersection of the entry 162 with crosscuts to be extended from the mine face 171. Simultaneously, with the mine operation in entry 162, a roof bolter advances through the entry 160 beyond crosscut 174 to complete the roof bolt installation in entry 160 to the mine face 178.

Referring to FIG. 9 there are illustrated additional steps in the mining operation that include retracting the continuous mining machine 14 and the following sections of the cascading conveyor system 10 from the mine face 180 to entry 162 through the crosscut 174 to the main entry 164. In the main entry 164 the mining machine is forwardly advanced beyond crosscut 166 the length of a single block. From the main entry 164 the mining machine enters the previously formed turn and from mine face 171 drives the next crosscut 182 through entry 160 to form mine face 184 and mine face 186.

As additional sections of the support beam 12 are installed in the newly cut portions of the mine vacated by the machine 14, roof bolting operations are completed in entry 162 from crosscut 174 to the mine face 180. Also, during the time in which additional support beams 12 are installed in crosscut 182 and the roof is bolted in entry 162, the continuous mining machine advances in the main entry 164 to mine face 187. Also, a turn is made to mine face 188 for the crosscut beyond crosscut 166. Thus, with this method of mining utilizing the conveyor system of the present invention, the mining machine remains operational without interruption due to a slow down in the conveyance of material from the mine face or installation of roof bolts.

From mine face 188, the continuous mining machine and following conveyor system 10 are retracted in the main entry 164 to crosscut 166. The crosscut 166 is extended beyond entry 158 to entry 156 and mine face 190. As the crosscut 166 is developed between entries 158 and 156, conveyor support beam sections 12 are erected to the mine faces 187 and 188 in the main entry 164. Once the continuous mining machine has advanced to mine face 190 in entry 156, the mining machine and the following conveyor sections are retracted in crosscut 166 so that the mining machine may advance forwardly in entry 158 beyond crosscut 166. The mining machine advances to mine face 192 where the next successive crosscut will connect entry 158 with the main entry 164. Accordingly, as entry 158 is extended, a conventional roof bolter installs roof bolts in crosscut 166 between entries 158 and 156 to mine face 190 and further installs additional support beams 12 for the cascading conveyor system 10.

Once the mine face 192 and entryway 158 are developed, the continuous mining machine 14 is retracted rearwardly into crosscut 166 toward the main entry 164 into position for advancement into entry 156. From the last section of support beam erected at the intersection of crosscut 166 and entry 156, the mining machine advances from mine face 190 forwardly to develop mine face 194. The mine face 194 is positioned at the approximate intersection of entry 156 with a future crosscut to be formed for connecting entries 156 and 158 with the main entry 164. During the formation of the forward extension of entry 158 to mine face 192, and similarly when the continuous mining machine 14 and conveyor sections are retracted from entry 156, the roof bolter installs roof bolts to mine face 194.

The mining method of the invention may be carried out by operation of a conventional material haulage vehicle, such as a shuttle car, operating between the continuous mining machine 14 and the material receiving section of the cascading conveyor system 10. Specifically, by disengaging the material receiving section of the cascading conveyor system 10 from the material discharging end portion 54 of the transfer apparatus 48, the mining machine 14 is operable to advance independently of the conveyor system 10. Applying this principle to the embodiment illustrated in FIG. 9, the mining machine 14 is advanced forwardly in entry 156 beyond the mine face 194. A conventional shuttle car (not shown) operates to receive the mined material from the material discharging end portion 54 of the transfer apparatus 48. The shuttle car transports the mined material for deposit onto the material receiving section of the conveyor system which remains stationary at approximately the location of previously formed mine face 190. Thus, the mining operation remains continuous by operation of the shuttle car between the mining machine and the cascading conveyor system.

Thus, in accordance with the present invention it will be apparent that a systematic continuous mining operation may be carried out with the cascading conveyor system 10 progressively advancing along its support on the mine roof with the continuous mining machine 14. The conveyor sections from the material receiving section to the intermediate sections and the material discharge section are operable to maintain continuous rearward movement of the dislodged material from the mining machine. By advancing the conveyor system with the mining machine, a continuous conveyor path connects the mining machine with the main haulage belt for removing the dislodged material from the mine. With this arrangement, the mining machine is able to sustain substantially uninterrupted operation not otherwise attainable by conventionally known mining methods.

By coordinating the operations of installing the cascading conveyor system 10 by permanent supporting structures or temporary supporting structures, and the roof bolting operations in those areas where the miner has operated, the mining operation becomes substantially continuous. Thus, maximum efficiency of the continuous mining machine is obtained by conveying dislodged material from the machine by the cascading conveyor system at the rate the machine dislodges material from the mine face.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A conveyor system for transporting mined material in a mine comprising,
   a plurality of longitudinally extending conveyor assemblies each having an independent endless conveyor,
   said endless conveyor assemblies each having a receiving end portion and a discharging end portion,
   said receiving end portion of each of said endless conveyor assemblies having an enlarged surface area maintained in underlying relation with said discharging end of an adjacent endless conveyor assembly for receiving the mined material discharged therefrom,
   drive means positioned on each conveyor assembly for rotating said endless conveyor at a preselected speed to transport the mined material from said receiving end portion to said discharging end portion,
   said discharging end portion of each of said conveyor assemblies arranged in overlapping relation with said receiving end portion of an adjacent conveyor assembly, said receiving end portion pivotally connected to said discharging end portion to permit conveyance of mined material along a curved path formed by said endless conveyors, a roof engaging member for supporting each of said conveyor assemblies for longitudinal movement adjacent the mine roof, ground engaging means for securing said roof engaging member to the mine roof, each of said endless conveyor discharging end portions having a yoke member extending from said respective conveyor discharging end portion into overlying relation with said receiving end portion of an adjacent conveyor assembly, each of said endless conveyor receiving end portions having an upwardly extending bracket member with a pivot plate extending forwardly therefrom, said pivot plate being secured at one end to said upwardly extending bracket member and extending above said endless conveyor receiving end portion into underlying relation with said yoke member, a conveyor support member secured at one end to said roof engaging member and detachably secured at the other end to said upwardly extending bracket member, said conveyor support member arranged to connect said endless conveyor receiving end portion to said roof engaging member and support said endless conveyor receiving end portion in an elevated position for longitudinal movement on said roof engaging member, said conveyor support member having connecting members rotatably supported on said roof engaging member and extending vertically downward toward each of said conveyor assemblies, a pivot support extending upwardly from said receiving end portion of each of said conveyor assemblies adjacent to the lower end portion of said connecting members, means for connecting said pivot support to said connecting members and thereby suspend each of said conveyor assemblies from the mine roof for longitudinal movement relative thereto, a vertical pivot pin connecting said pivot plate to said yoke member, and said yoke member being pivotally connected to said pivot plate by said pivot pin to permit horizontal pivotal movement of the adjacent end portion of said endless conveyor assembly about a vertical axis and support said adjacent endless conveyor discharging end portion from a common conveyor support member.

2. A conveyor system for transporting mined material in a mine as set forth in claim 1 which includes, a C-frame member having a telescoping body portion with a lower end portion engaged to the mine floor and an upper end portion engaged to the mine roof, said C-frame upper end portion extending transversely across the roof of the mine, a series of roof engaging beam members rigidly secured to said upper end portion and extending longitudinally in end to end relation adjacent the mine roof, and each of said conveyor assemblies being movably connected to said series of roof engaging beam members by said conveyor support member.

3. A conveyor system for transporting mined material in a mine as set forth in claim 1 which includes, said receiving end portion of each of said endless conveyors being positioned relative to the mine roof at a lower elevation than said discharging end portion of each of said endless conveyors to provide an upward conveying path for each conveyor assembly to control the flow rate of the mined material from said receiving end portion to said discharging end portion.

4. A conveyor system for transporting mined material in a mine as set forth in claim 1 which includes, an endless belt conveyor positioned on the mine floor in underlying relation with at least one of said conveyor assemblies, and said drive means operable to rotate a selected one of said conveyor assemblies endless conveyor in a preselected direction to discharge the mined material from said selected conveyor assembly onto said endless belt conveyor for removal from the mine.

5. A conveyor system for transporting mined material in a mine as set forth in claim 1 which includes, said series of conveyor assemblies having a material receiving section and a material discharge section, a plurality of connected intermediate sections connecting said material receiving section with said material discharge section, a continuous mining machine operable to dislodge material from the mine face and convey the mined material rearwardly therefrom, said material receiving section being connected in material receiving relation with said continuous mining machine so that the mined material is continuously conveyed from said material receiving section to said intermediate and material discharge sections at the rate said continuous mining machine dislodges material from the mine face, and said conveyor assembly sections being movable with said continuous mining machine.

* * * * *